United States Patent [19]

Shepard et al.

[11] 3,957,448

[45] May 18, 1976

[54] DIVIDED HORIZONTAL REACTOR FOR THE VAPOR PHASE POLYMERIZATION OF MONOMERS AT DIFFERENT HYDROGEN LEVELS

[75] Inventors: John W. Shepard, Naperville; James L. Jezl, St. Charles; Edwin F. Peters, Winfield; Robert D. Hall, Wheaton, all of Ill.

[73] Assignee: Standard Oil Company, Chicago, Ill.

[22] Filed: Dec. 16, 1974

[21] Appl. No.: 533,019

[52] U.S. Cl. .................. 23/288 R; 23/285; 23/288 E; 23/288 S; 260/94.9 P; 260/95 R; 260/94.9 D; 423/659 F; 34/57 A; 432/58; 165/104 F; 526/65; 526/67; 526/335; 526/344; 526/346; 526/349; 526/351; 526/352

[51] Int. Cl.² ............... B01J 8/36; B01J 8/38

[58] Field of Search .......... 23/288 S, 288 R, 288 E, 23/285; 423/659 F; 260/94.9 P, 95 R, 95 C, 94.9 D, 94.9 C; 34/10, 57 A; 259/DIG. 17, 9; 432/58; 165/104

[56] References Cited
UNITED STATES PATENTS

| | | | |
|---|---|---|---|
| 2,292,897 | 8/1942 | Nielsen | 34/10 UX |
| 2,797,908 | 7/1957 | Zubrzycki | 23/288 S X |
| 2,936,303 | 5/1960 | Goins | 260/94.9 P X |
| 3,245,762 | 4/1966 | Ullrich et al. | 23/285 |
| 3,368,875 | 2/1968 | Tulleners | 23/288 E |
| 3,514,501 | 5/1970 | Leibson et al. | 260/94.9 P X |

Primary Examiner—James M. Tayman, Jr.
Attorney, Agent, or Firm—Reed F. Riley; Arthur G. Gilkes; William T. McClain

[57] ABSTRACT

Apparatus for the vapor phase polymerization of at least one polymerizable monomer comprising: (a) a horizontal reactor of substantially circular cross-section containing a centrally-located drive shaft extending longitudinally through said reactor to which are attached a plurality of adjacently located paddles, which paddles cause essentially no forward or backward movement of the particulate matter contained in said reactor and extend transversely within and to a short distance from the internal surfaces of said reactor, said reactor being divided into two or more individually gas-composition-controllable and polymerization-temperature-controllable polymerization compartments, by one or more dividing structures so constructed to control gas intermixing and movement of said particulate matter between said compartments; (b) driving means for said drive shaft; (c) one or more reactor off-gas outlets in each of said compartments spaced along the topward part of said reactor; (d) one or more vapor recycle inlets in each of said compartments spaced along the bottomward portion of said reactor; (e) one or more catalyst addition inlets in each of said compartments spaced along said reactor; (f) a plurality of quench liquid inlets spaced along the topward part of said reactor whereby quench liquid can be introduced into said two or more compartments; and (g) takeoff means for said particulate matter at one end of said reactor.

11 Claims, 4 Drawing Figures

DIVIDED HORIZONTAL REACTOR FOR THE VAPOR PHASE POLYMERIZATION OF MONOMERS AT DIFFERENT HYDROGEN LEVELS

SUMMARY OF THE INVENTION

This invention relates to a novel, divided reactor for carrying out the vapor state polymerization of a polymerizable monomer or mixture thereof wherein said reactor contains two or more compartments each capable of being maintained at a different hydrogen partial pressure and, optionally, different polymerization temperature, and, more specifically, to a divided, horizontal, stirred-bed, quench-cooled, essentially total reactor off-gas recycle reactor for the vapor state, essentially isobaric polymerization of a monomer or mixture thereof using a high yield catalyst, and, optionally, cocatalyst wherein each of the two or more compartments contained therein is capable of being maintained at a different hydrogen partial pressure, and, optionally, polymerization temperature and polymer production rate, whereby the molecular weight, molecular weight distribution and particle size distribution of the resulting polymer forming in the reactor may be controlled.

In accordance with the instant invention a novel, divided, reactor is disclosed which can economically and efficiently convert a polymerizable monomer or a mixture thereof in a vapor state, essentially isobaric polymerization process, which reactor is a horizontal, stirred-bed, quench-cooled, essentially total reactor off-gas recycle reactor containing a subfluidized polymer bed distributed in two or more compartments each having one or more polymerization sections, each such compartment capable of being maintained at a different hydrogen partial pressure, and, optionally, polymerization temperature and polymer production rate, and wherein each of such compartments is connected to a separate reactor off-gas recycle treatment area allowing for separate off-gas clean-up and return.

BACKGROUND OF THE INVENTION

One of the problems in solution or slurry polymerization of monomers is the capital costs required in the production thereof. Monomer polymerization using a vapor phase process can be considerably more economical if certain problems inherent in vapor state polymerization can be solved. These include problems of carrying out the polymerization in a thermally controlled fashion so as to avoid hot spots, maintaining a proper product particle size distribution and, in the case where catalysts are utilized which give extremely high yields but are extremely sensitive to poisoning, decreasing to a minimum the amount of make-up material seen by the catalyst per amount of product formed. Another problem, related to certain catalyst combinations, is the narrow molecular weight-distribution of the products formed with these catalysts. Now we have discovered a vapor phase reactor which largely or completely solves the above referred to problems and realizes important economic benefits through savings in energy consumption, raw materials and capital equipment.

In U.S. Pat. No. 2,502,953 (Jahnig) a weired, downwardly oriented apparatus for contacting fluidized solid particles with gaseous fluids to purge or strip volatiles from such solids is taught.

In U.S. Pat. No. 2,936,303 (Goins) a vapor state polymerization of ethylene, propylene or mixtures thereof is carried out in a countercurrent, fluidized bed in the presence of inert diluent gas. In the process described therein catalyst in solid form is passed downwardly in the reactor and, for example, ethylene mixed with diluent gas is passed countercurrently up through a series of vertical fluidized bed reaction zones. In this process the reaction in the various reaction zones can be controlled independently by taking cooled off-gas from the last reaction zone, cooling it, and recycling portions of such off-gas to each of the reaction zones. However, because of the use of diluent gas and a fluidized bed large quantities of gas must be passed through the reactor per unit of polymer produced.

In U.S. Pat. No. 3,023,203 (Dye) a suspended, gas phase polymerization of olefins using a reactor having three concentric superimposed vertical sections, comminuted catalyst addition suspended in the entering gases and temperature regulation by gas cooling is shown and the process includes polymer removal without pressure letdown.

In U.S. Pat. No. 3,254,070 (Roelen) a method for the gas phase polymerization of ethylene using conventional cooling is described wherein a mixture of reaction products and solid or liquid catalysts is constantly being mechanically subdivided. This patent additionally teaches that the reacting material may be agitatingly moved through a number of stages each with different polymerization conditions. An additional mode described therein teaches that the first few stages may be carried out using liquid phase polymerization finishing up with polymerization in the vapor phase. Different polymerization temperatures may be used in the separate reactors.

In U.S. Pat. No. 3,256,263 (Wisseroth et al.) a method of removing heat and producing intensive movement of the polymeric product produced during the gas phase polymerization of olefins in a stirred, vertical, fluidized reactor is described using mechanical agitation and introduction of the polymerization monomer immediately after expansive cooling in the form of moving gas or liquid jets.

In U.S. Pat. No. 3,300,457 (Schmid et al.) polymerization of mono-olefins, particularly ethylene and propylene, is accomplished in a fluidized bed using a stirred, vertical reactor. Catalysts and polymer in the reactor are moved in the direction of flow of the mono-olefin by the stirring and heat is removed by cooling the walls of the vessel, by conduction using the gas stream, or by the introduction of liquified mono-olefin.

In U.S. Pat. No. 3,469,948 (Anderson et al.) a horizontal, paddle-type polymerization reactor using pulsed purge gases including the polymerizable olefin is described. The teaching of this patent is directed to the use of longitudinally oriented paddles which are suitably shaped to give forward movement to the solid polymer resulting from the vapor phase polymerization.

In U.S. Pat. No. 3,652,527 (Trieschmann et al.) a process for the gas phase polymerization of propylene in a stirred-bed, vertical reactor using evaporative cooling of the reaction is described. This patent teaches that it is essential that one component of the catalyst combination must be directly placed on the bed of solid polymer produced in the polymerization and the second catalyst component must be introduced in the gas phase above the bed.

Finally, in British Patent No. 1,354,020 (Badische) a vapor phase olefin polymerization process is described in which the heat generated in the polymerization process is removed by the introduction of the monomer and heat transfer agents in gaseous or liquid state in the polymerization zone. However, the use of multiple polymerization temperatures in the vertical, stirred, fluid-bed reactor is not taught and it is difficult to see how such individual control could be accomplished in the apparatus described.

STATEMENT OF THE INVENTION

The invention described herein is a sectioned, compartmented, horizontal reactor useful for the vapor phase, essentially isobaric polymerization of polymerizable monomers utilizing essentially total reactor off-gas recycle and a quench-cooled, stirred-bed mode of operation in which at least one of the compartments has a different vapor composition than the others and in which at least one section may be operated at a polymerization temperature and/or polymer production rate different than the other sections.

The reactor is particularly adapted for use with polymerization catalysts which have a high enough polymerization yield that catalyst residues need not be removed from the polymeric product during the polymer finishing process. In general, the reactor utilizes a controlled introduction of catalysts and quench liquid into the one or more sections contained in each compartment directly into and onto the stirred, subfluidized bed of forming polymer solid and polymerization of monomer from the vapor phase in and over such bed. The polymer solid is continuously removed by passing through a take-off barrier generally situated at one end of the reactor into a take-off vessel.

The reactor introduces monomer or a mixture thereof and, optionally, hydrogen largely or wholly underneath the polymer bed and quench liquid onto the surface of the bed. Each compartment has a separate off-gas removal line, a quench liquid separation zone and a separate vapor recycle return. Each compartment of the reactor may have one or more polymerization sections separated by baffles and, in a preferred mode, the two or more sections in each compartment are separated from each other by weirs or other suitably shaped baffles to prevent gross backmixing between sections. Each section may be individually controlled in terms of polymerization temperature and polymer production rate.

The two or more compartments are separated by a dividing structure so constructed that it serves to control vapor intermixing between compartments but allows free polymer particle movement from one compartment to the other essentially in the direction of the take-off. A polymeric product having a controlled spread of molecular weight, molecular weight distribution and particle size distribution is more easily produced by the above described reactor.

Reactor off-gases from each compartment are removed along the top of the reactor after removing polymer fines as completely as possible from the off-gas stream. Such reactor off-gases are led to a separation zone whereby the quench liquid is at least in part separated along with any further polymer fines and some of the catalyst components from polymerization monomer and hydrogen, if used, which monomer and hydrogen are then recycled to inlets spaced along the various polymerization sections of the reactor compartment generally underneath the surface of the polymer bed. A portion of the quench liquid including the further polymer fines is taken off the separation zone and in major part returned to inlets spaced along the top of the reactor compartment. A second small portion of separated quench liquid free of polymer fines and catalyst components is fed into a catalyst make-up zone for catalyst diluent so that fresh quench liquid need not be introduced for that purpose. Provision may be made in the reactor to introduce the catalyst components and quench liquid at different rates into one or more of the polymerization sections of each of the reactor compartments to aid in control of the polymerization temperatures and polymer production rates. Catalyst components may be added on the surface or below the surface of the bed.

The recycle system of the process is designed so it together with the reactor operate essentially isobarically. That is preferably there is no more than a ±25 psig pressure change in the recycle system and reactor, more preferably ±10 psig which is the normal pressure variation expected from operations.

By the term vapor state reactor or process is meant a reactor or process, the monomer or monomers of which are vapors or gases under the conditions prevailing in the reactor.

Figure 4:
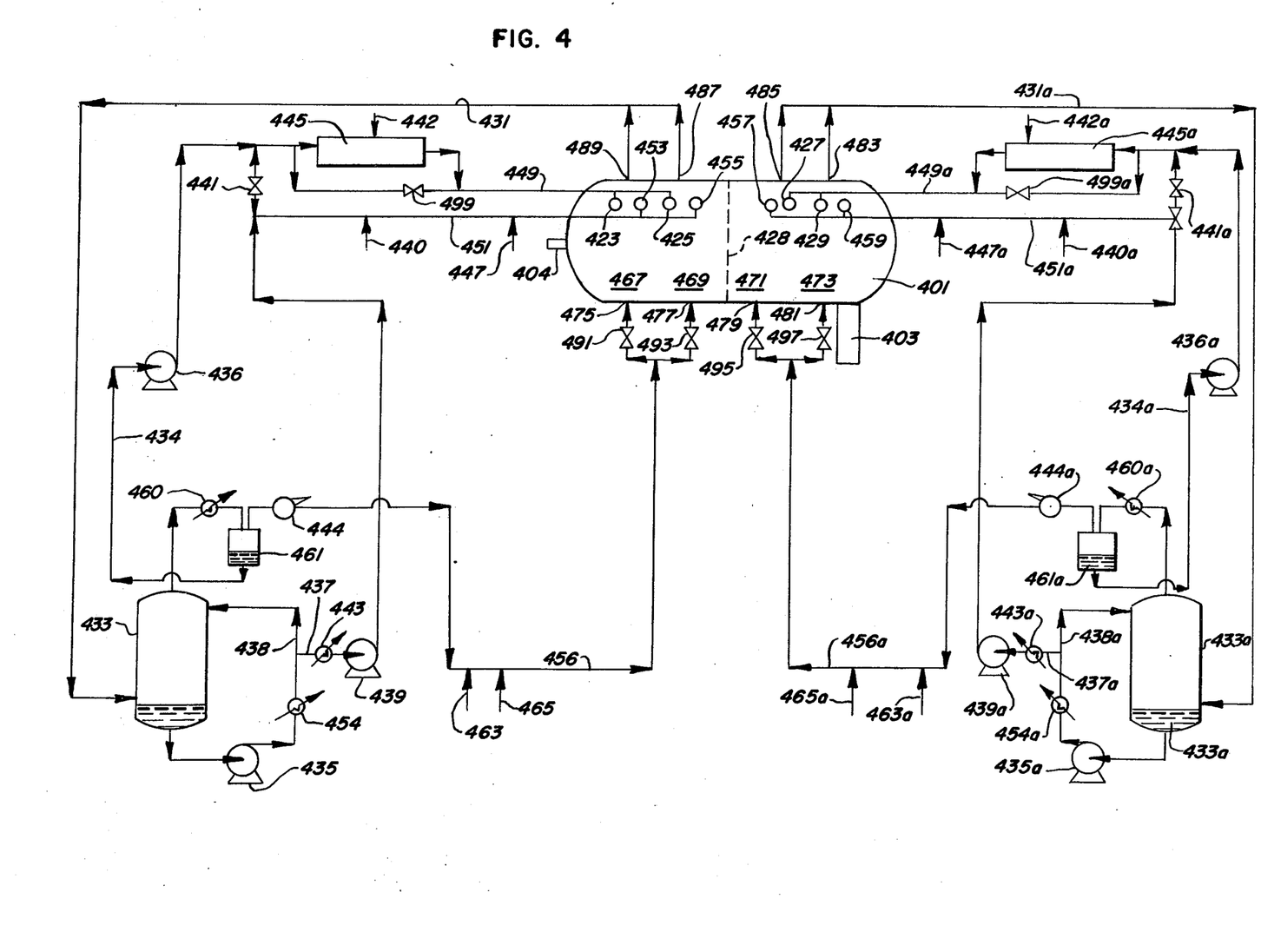
FIG. 4 shows one manner in which the reactor described herein may be employed essentially isobarically with essentially total reactor off-gas recycle.

One embodiment of an essentially isobaric process using the reactor of this invention is shown in detail in FIG. 4 which Figure may be divided roughly into two areas, the reactor area and the reactor off-gas treatment (separation) and catalyst make-up area.

As may be seen by looking at FIG. 4 the reactor volume of horizontal polymerization reactor 401 is divided into several stirringly agitated sections 467, 469, 471 and 473 to provide for the possibility of operating the different sections of the reactor at different temperatures and different polymer production rates. The reactor is also divided into two compartments by dividing structure 428. Polymerization takes place in each of the aforementioned sections to form a polymer bed distributed throughout the reactor.

The polymerization temperature of each of the sections may be individually controlled by a combination of methods including the stirring agitation, the controlled differential introduction of vapor recycle into each of the sections through inlets 475, 477, 479 and 481 spaced along the bottom of the reactor and the introduction into each of the sections of inert quench liquid and catalyst components at different rates through quench liquid inlets 453, 455, 457, and 459 and catalyst inlets, 423, 425, 427 and 429 spaced along the top of the reactor.

Reactor off-gases are removed through outlets 483, 485, 487, and 489. Since a certain deleterious amount of polymer fines may be produced in the reactor they should be substantially removed prior to transfer of the reactor off-gases to the reactor off-gas treatment and catalyst make-up area by using traps, filters, settlers, cyclones or scrubbers or a combination thereof.

Polymer solid is produced then in each of the stirringly agitated sections 467 through 473 and, due to the continued production of such polymer, an amount of product constantly passes through the aperture of the take-off barrier and out of the reactor into polymer take-off vessel 403.

Catalyst, dissolved or slurried in recycle quench liquid, is advantageously introduced onto the surface of the bed in at least one section of each reactor compartment through inlets 423, 425, 427, and 429. Similarly placed inlets 453, 455, 457, and 459 are used to introduce the recycle quench liquid, which may contain cocatalyst make-up from lines 447 and 447a, onto the bed in the individual reactor sections. However, depending upon the nature of the catalyst, cocatalyst and monomer to be polymerized, catalyst and/or cocatalyst can be sprayed or otherwise introduced into the reactor neat or in other non-polymerizable vehicles. Alternatively, for some monomers, catalyst and cocatalyst can be added in make-up zones 445 and 445a and together introduced into the reactor.

As may be seen each compartment has its own quench liquid recycle line, 451 and 451a, and catalyst addition line, 449 and 449a. However, catalyst make-ups 445 and 445a can be combined as only one catalyst make-up zone may be required. Also, a single quench liquid separation zone can be used for the multi-compartment reactor described herein as long as the proper differential amounts of hydrogen in the separate vapor recycle lines and hence reactor compartments can be maintained.

In one important mode of operation, more than one monomer may be used in a given compartment and in such mode the monomers may be used in each of the two or more compartments at the same or different partial pressures.

In one mode of operation it has been found advantageous to make the catalyst and quench liquid inlets concentric so that the catalyst and quench liquid are sprayed into the reactor and onto the surface of the polymer bed in such a way as to more evenly distribute catalysts on the polymer bed surface. However, the catalyst and quench inlets may be made separate and the catalyst and quench liquid introduced separately to the bed.

Catalyst components are generally added to at least one section of the compartment having the higher hydrogen concentration although catalyst components may be added to at least one section of each compartment.

The reactor off-gases are taken via lines 431 and 431a to scrubber towers 433 and 433a wherein at least part of the quench liquid component of the off-gases and further polymer fines and cocatalyst, if used, are removed from the polymerizable monomer and hydrogen, if used. The polymerizable monomer and hydrogen together with some quench liquid vapors are returned to the separate compartments of reactor 401 from the top of towers 433 and 433a at a rate designed to prevent fluidization of the bed, after advantageously passing through heat exchangers 460 and 460a and separators 461 and 461a to remove additional quench liquid, via blowers 444 and 444a and vapor recycle lines 456 and 456a with additional hydrogen and monomer make-up being added via lines 463, 463a, 465 and 465a. The amount of the vapor recycle introduced into the individual sections of the two compartments of the reactor via inlets 475, 477, 479, and 481 can be individually controlled by valves 491, 493, 495, and 497. The quench liquid of separators 461 and 461a is essentially free of polymer fines and catalyst components and suitable for use in catalyst make-up zones 445 and 445a.

Quench liquid separated from the reactor off-gases is cooled by heat exchangers 454 and 454a and returned in major portion to the top of scrubber towers 433 and 433a via lines 438 and 438a. A minor portion of separated quench liquid is returned through lines 437 and 437a, heat exchangers 443 and 443a, pumps 439 and 439a and quench liquid recycle lines 451 and 451a to quench liquid inlets 453, 455, 457, and 459 carrying with it some monomer, hydrogen, cocatalyst and the entrained polymer fines carried by the off-gases into scrubber towers 433 and 433a. In the important embodiment in which cocatalyst is used, make-up cocatalyst may be added to catalyst make-up zones 445 and 445a, injected directly into the recycle quench liquid stream through lines 447 and 447a or may be added neat or in another non-polymerizable vehicle directly into reactor 401. A small portion of quench liquid is taken off separators 461 and 461a and passed through lines 434 and 434a and pumps 436 and 436a to catalyst make-up zones 445 and 445a for catalyst diluent.

Polymerization in catalyst make-up zones 445 and 445a or associated lines 449 and 449a and inlets 423–429 can cause serious plugging problems and may be controlled by keeping the cocatalyst concentration in make-up zones 445 and 445a below a certain value, which value depends upon the identity of the catalyst and cocatalyst used and the monomer or monomers to be polymerized. Where cocatalyst is added to catalyst make-up zones 445 and 445a provision may have to be made to prevent polymerization from occurring in associated lines and inlets by, for example, cooling the make-up zones or decreasing the residence times. Alternatively, make-up quench liquid from lines 447 and 447a can be used in catalyst make-up zones 445 and 445a in place of recycle quench liquid to prevent polymerization of monomer in said zones.

Valves 499 and 499a have been provided in the catalyst make-up zones, bypass lines in order to more easily vary the concentration of catalyst in the catalyst make-up introduced into the reactor. It has been found that particle size of the polymer produced in reactor 401 can be advantageously varied by varying the concentration of the catalyst being introduced through inlets 423, 425, 427 and 429. Further, it has been found advantageous to vary the catalyst concentration either by changing its concentration in make-up zones 445 and 445a or, additionally and alternatively, to change its concentration by introducing quench liquid into catalyst lines 449 and 449a via valves 499 and 499a just prior to the point where the catalyst enters catalyst inlets 423, 425, 427, and 429. Make-up catalyst is added through lines 442 and 442a.

The polymer solid which builds up in stirred reactor 401 traverses the length of reactor essentially because of polymer build-up in the reactor bed and not by the stirring agitation. This condition is insured by the paddle design used which provides for agitation but not for backward or forward movement of the bed. Polymer particles in the bed adjacent to the take-off barrier are swept by the stirring through the take-off barrier opening, which opening may be made variable in position and size by a number of devices for different rates of polymer solid removal from the bed and for controlling the depth of the bed.

Weirs, if used, may be attached to drive shaft 404 or fixed to the walls of reactor 401 and are beneficially oriented so that the top of the weir is roughly aligned with the bed orientation during agitation. This provides for spill-over along the entire length of the weir top. However, the weirs can be oriented horizontally, if desired. Alternatively, baffles of other shapes may be used to fulfill the function of the weirs which is to prevent gross back-mixing of the polymer in the several polymerization sections. For example, thin wall barriers attached to the drive shaft 404 which fill the entire cross-section of the reactor and have one or more holes cut in them may be used.

Dividing structure 428 is so constructed to fill the entire cross-section of reactor 401 to control intermixing of vapors in the two compartments. Structure 428 has one or more holes cut in it located so that such hole or holes are completely below the bed level to allow free movement of the polymer solid from one compartment to the adjacent one in the direction of polymer take-off vessel 403.

Generally, the dividing structures are designed to prevent extensive mixing of the vapors in the individual compartments, however, in one mode of multiple hydrogen operation the vapors are deliberately mixed by feeding the vapors from the hydrogen poor compartment to the hydrogen rich compartment and adding make-up monomer primarily to the hydrogen poor compartment and hydrogen make-up primarily to the hydrogen rich compartment.

The polymer particles passing through the take-off barrier opening fall into polymer take-off vessel 403. The polymer solid taken off can be treated with kill substance and additives and melt extruded in the ways conventional to the art or it can be taken off without substantial pressure letdown in such a way that the solid is melted in vessel 403 and the resulting molten polymer treated with kill substance and additives and devolatilized while still in the molten state and then finished into commercially sized polymer product by conventional techniques.

Figure 1:
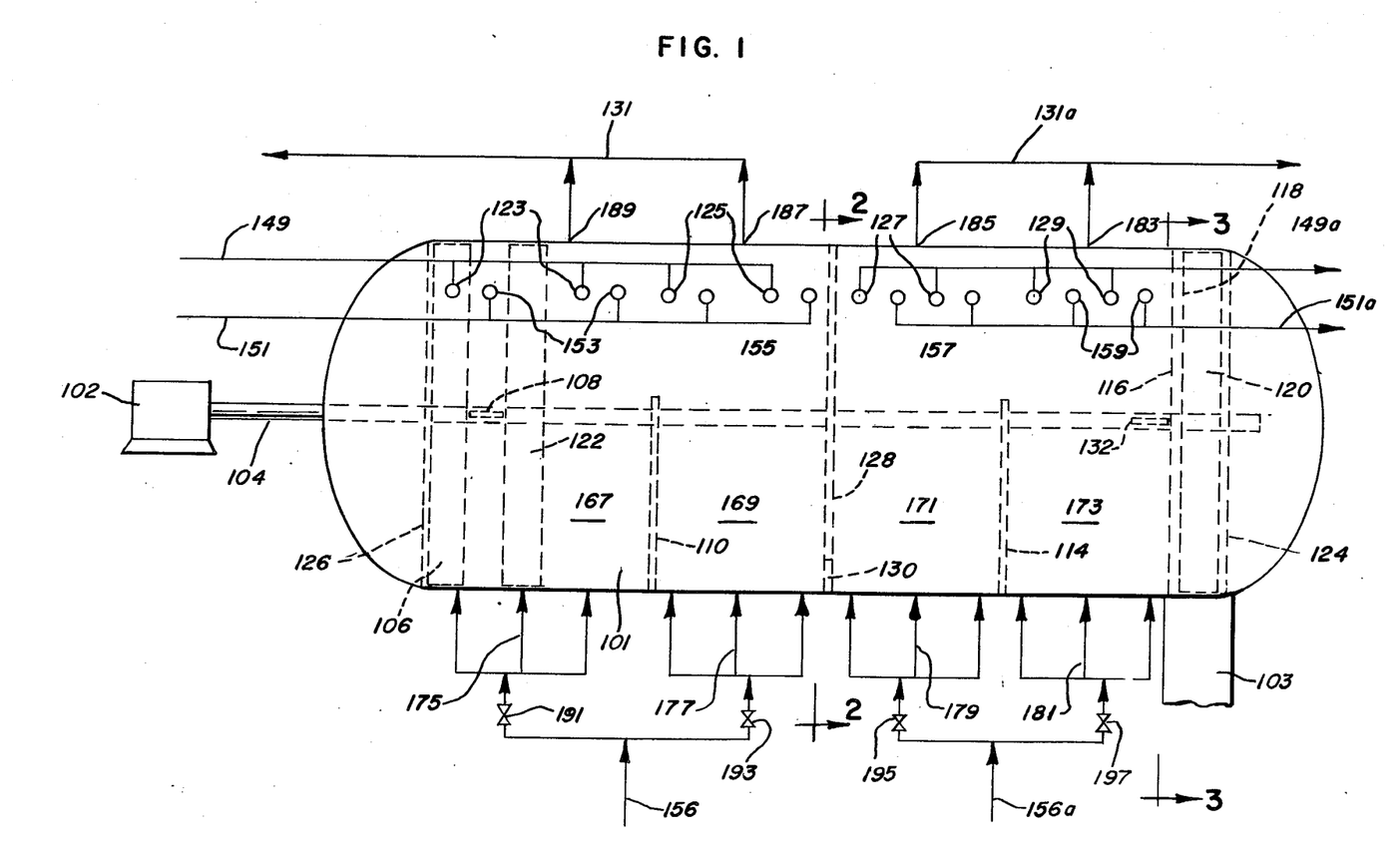
FIG. 1 shows one embodiment of the reactor described herein.

FIG. 1 shows in detail reactor 401 of FIG. 4. It may be seen that the interior of reactor 101 is composed of four individually controllable polymerization sections 167 to 173 separated from one another by weirs 110 and 114, which weirs extend upwardly to somewhat over the middle of the reactor and are oriented so that their top surfaces line up approximately with the surface of the agitated polymer bed. The reactor shown has one dividing structure 128 which divides reactor 101 into two compartments having separate vapor compositions. Divding structure 128 contains a hole 130 located below the polymer bed to allow for free transfer of the polymer solid from one compartment to the other in the direction of take-off vessel 103. All weirs are constructed in height so that the polymer powder bed fills about half the volume of the reactor. As the polymer exceeds the weir height it falls into the adjacent section. The dividing structure is a thin wall barrier filling the cross-section of and extending to the top of reactor 101 and contains a variably sized opening 130 situated beneath the polymeric bed so that polymer can be transported to take-off vessel 103. Operating in such a variable gas composition mode, the individual compartments should have separate reactor off-gas recycle treatments and returns and provision may be made for the introduction of different amounts of hydrogen and monomer into the separate vapor recycle lines. Reactor 101 generally contains false end plates 124 and 126 for ease of mechanical construction.

The interior of the reactor is equipped with a rotating paddle drive shaft 104 extending longitudinally through reactor 101 to which are attached paddles extending transversely from the shaft and making close clearance with the inside wall of reactor 101 to insure adequate bed mixing at the reactor wall. The paddles are preferably flat to maximize bed agitation for a given rotational speed and preferably two paddles per impellor are used. The width of the paddles is such that between about four and about twelve impellers (8 to 24 paddles) will be present in a reactor section of about three feet in length. The orientation of the paddles on adjacent impellors is about 90°. The paddles are so constructed to minimize any forward or backward movement of the bed during stirring and are driven by motor 102 at such a speed as to give a slow and regular turnover of the entire polymer bed contained in the reactor. The speed at which the impellors turn should be fast enough to provide the desired heat and mass transfer between liquid, solid and gas but not so fast that the finer portions of the polymer solid are thrown up in large quantities into the space above the bed. That is, the speed typically is about 5 to about 30 RPM so that the integrity of the bed is maintained.

The section following the take-off barrier above the take-off vessel is likewise equipped with one or more two-paddle impellors, 120, the number of which depend upon the size of the take-off. However, take-off assemblies such as end or side take-off apertures, which assemblies replace the take-off barrier may be used as will be recognized by one skilled in the art.

A plurality of catalyst and quench inlets may be used in reactor 101 and one or more pairs of catalyst and quench inlets may be used for each reactor section, 167 to 173. The catalyst and quench inlets are typically designed so that the catalyst and quench liquid are distributed onto the top of the stirred bed at roughly the same location. Such introduction of catalyst and quench liquid combined with slow agitation has been found to provide more uniform polymerization and prevent localized fusion in the polymer bed and hence reduce the number of molten plugs of polymer formed and give more trouble free performance of the reactor. It is advantageous in one mode of carrying out polymerization in the reactor to provide for separately controlled addition of catalyst components and quench liquid to the polymerization sections by means of, for example, valves. Such separately controlled additions into reactor sections 167 to 173 help provide for separate control of polymerization temperatures and polymer production rates among the sections and can be used to vary and control the molecular weight, molecular weight distribution and particle size distribution of the polymeric product.

The vapor recycle which includes the polymerizable monomer or monomers and hydrogen, if used, is brought into the two compartments through vapor recycle lines 156 and 156a and vapor recycle inlets 175 to 181 at a rate designed to prevent fluidization of the polymer bed. The rate at which the vapor recycle gases are introduced into the individual sections 167 to 173 can be controlled by valves 191 to 197 and such control may be used to help vary the section temperatures and polymer production rates, if desired.

In an important embodiment of a process using the reactor described herein in which the polymerization temperature of one or more of the sections is held at a different value than in the other section or sections (dual temperature or multi-temperature operation), it is advantageous to vary the concentration of any or all of the catalyst components being introduced into the various sections. Particle size and molecular weight distributions are thereby advantageously affected. This may be accomplished by feeding the catalyst inlets of the different sections individually. Even in single temperature operation, it can be advantageous to feed one or more of the sections with catalyst components in different amounts than catalyst components being introduced into the other section or sections.

The overall reactor temperature range for polymerization depends upon the particular monomer which is being polymerized and the commercial product desired therefrom and as such are well known to those skilled in this art. In general, the temperature range used varies between about 40°C up to about the softening temperature of the bed. The total polymerization pressure is composed of the polymerizable monomer pressure, vaporized quench liquid pressure, and hydrogen pressure, if used, and such total pressure typically may vary from above about atmospheric to about 600 psig. The individual partial pressures of the components making up the total pressure determine the rate at which polymerization is desired to occur, the molecular weight, and the molecular weight distribution of the polymer to be produced. The temperature of polymerization is controlled as may be understood by one skilled in the art.

Figure 2:
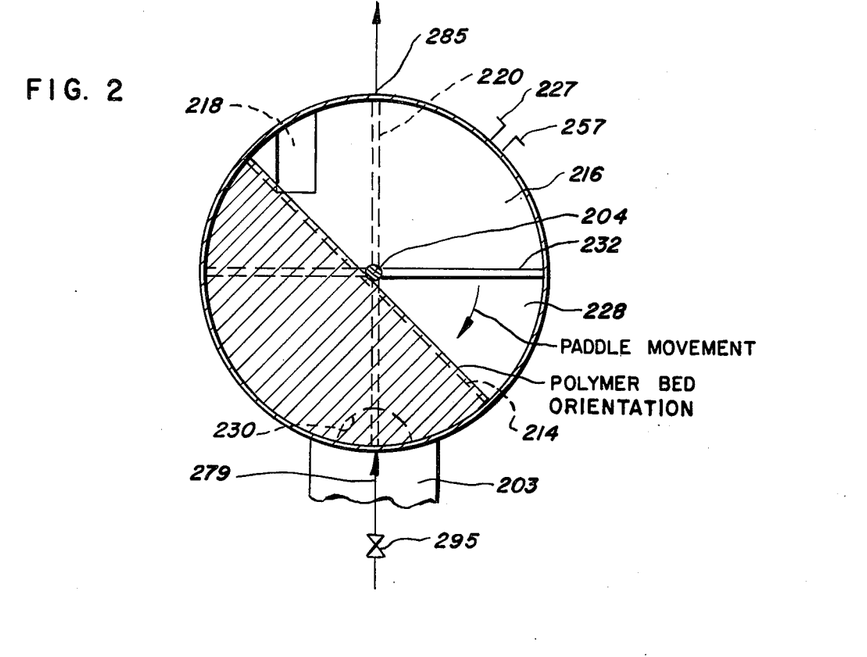
FIG. 2 shows a transverse view of the reactor along line 2—2 of FIG. 1.

In FIG. 2 a view of reactor 101 of FIG. 1 is shown along line 2—2 of FIG. 1. The Figure shows the ninety degree orientation of the paddles on adjacent impellors, the adjustable take-off barrier opening 218, dividing structure 228, its aperture 230, and take-off barrier 216. Further, the Figure shows the orientation of weir 214, the orientation of the polymeric powder bed, and the direction of paddle movement with respect to the bed orientation.

Figure 3:
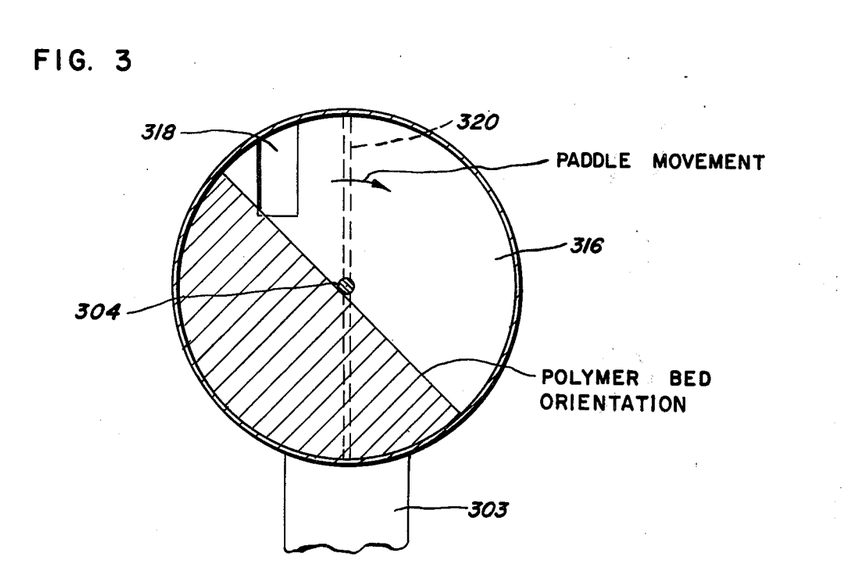
FIG. 3 shows a second transverse view of the reactor along line 3—3 of FIG. 1.

FIG. 3 shows a view of reactor 101 of FIG. 1 along line 3—3 of FIG. 1. Also shown are take-off barrier 316, its opening 318 and the direction of motion of the paddles with respect to adjustable take-off barrier opening 318 and the orientation of the polymer bed.

The apparatus and process described herein may be applied to the polymerization of polymerizable monomers which are polymerizable below the softening point of their polymer forms including ethene, propene, 4-methyl-pentene-1, butene-1, vinyl chloride, butadienes, styrene, poly(ethyleneterephthalate) and mixtures of such monomers. Particularly suitable are the polymerization of ethene and propene.

The quench liquid used for temperature control is a readily volatilizable liquid which can be sprayed onto the surface of the polymer bed to evaporatively conduct heat away from the polymer bed and thus must be inert to the monomer being polymerized, the catalyst components used in the polymerization, and have as high a heat of evaporation as is consistent with ready volatilization of the quench liquid in the reactor at the polymerization temperature. In general alkanes such as propane, a butane, a pentane, or a hexane or closely boiling mixtures thereof may be used. The preferred quench liquid for ethene is isobutane or isopentane. It should be understood that where the monomer to be polymerized is readily condensible, e.g. propene, the quench liquid can be liquified monomer or a mixture of liquified monomer and an additional quench liquid.

The rate of quench liquid addition should be low enough to keep the polymer bed dry, i.e. maintain the partial pressure of the quench liquid vapor below the dew point, yet large enough to obtain the maximum cooling effect of the quench liquid. Generally, the quench liquid should carry away 50 percent or more of the heat of polymerization. For propene polymerization over 90 percent of the heat of polymerization is desirably removed by the quench liquid. At a 200°F. polymerization temperature in the polymerization of ethene, desirably more than 70 percent of the heat of polymerization is removed using isobutane and more than 50 percent of the heat is removed using isopentane as quench liquids.

In general, the catalysts which are most useful to the process described herein are those which are very active and give a high yield on catalyst. Included in this group are cocatalysts composed of organometallic compounds of Periodic Groups IA, IIA and IIIA and catalysts which are based on transition metal compounds. Aluminum alkyl compound cocatalysts are especially preferred and may be a trialkylaluminum or an alkylaluminum halide such as a dialkylaluminum chloride. The transition metal catalyst can be a metal compound of Group IV or Group V such as a titanium compound or vanadium compound, a compound of Group VI such as chromium or molybdenum oxide or may be one of the above catalysts supported on a magnesium-based support or a support such as alumina, silica, or silica-alumina.

The preferred catalysts and cocatalysts are as aforesaid high yield catalysts. By high yield is meant catalysts and cocatalysts the residues of which do not have to be removed from the products of the process.

The preferred catalysts and cocatalysts for ethylene polymerization are a trialkylaluminum cocatalyst with a catalyst which is a titanium compound supported on magnesium-based support or chromium oxide supported on alumina, silica or silica-alumina. For propene polymerization it is preferable to use a dialkylaluminum chloride cocatalyst and a catalyst which is an active titanium chloride. However, the process and apparatus described herein are not meant to be limited to the catalyst and cocatalyst used except in that the process operates best using high yield catalysts.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

EXAMPLES I–III

A carbon steel reactor approximately 2 feet in diameter by 3.0 feet in length was used. Quench liquid was isopentane. Catalyst was a titanium compound supported on a magnesium compound and cocatalyst was triethylaluminum added in a weight ratio, cocatalyst/catalyst, of about 6 and at a catalyst rate of about 0.2 gram per hour. Production rate was about 12 pounds per hour. Catalyst and cocatalyst were added separately to zone one and product was removed from zone two of the reactor, the zones being separated by a dividing structure as described above.

Melt indices and inherent viscosities were measured by ASTM tests D 1238-72 (Cond. E) and D 2857 respectively. The ratio of weight average molecular weight to number average molecular weight, $\overline{Mw}/\overline{Mn}$, was measured by gel permeation chromatography.

Examples 1, 2 and 3 shown in the Table illustrate the effect upon molecular weight of operating two compartments at two different hydrogen levels as compared to operation of the reactor at a single hydrogen level. Example 1 represents a product produced from single hydrogen operation at a total pressure of 400 psig in which the polymerization is carried out at 210°F with 25 mol percent hydrogen in the recycle gas. The product has an inherent viscosity, $(\eta)$, of 2.0 dl/gram, a melt index of 0.97 grams/10 minutes and a relatively narrow molecular weight distribution, $\overline{Mw}/\overline{Mn} = 6$. Similarly, when the reactor is run at 210°F and 57 mol percent hydrogen, product properties are $(\eta) = 1.02$ dl/gram, M.I. = 28.6 and $\overline{Mw}/\overline{Mn} = 6$. When the reactor is run at 210°F and 57 mol percent hydrogen, product properties are $(\eta) = 4.5$ dl/gram. At the latter high molecular weight accurate melt index measurements are difficult and were not made.

In Example 2 of the Table the results given are for a polymerization in which the first compartment of the reactor was held at about 210°F/26 mol percent hydrogen and the second compartment was held at about 210°F/12 mol percent hydrogen and the relative production of polymer made in the first and second compartments was in a 42/58 weight ratio. The product exiting from the reactor had an inherent viscosity of 2.1 dl/gram and a melt index of 0.68. However, the measured $\overline{Mw}/\overline{Mn}$ of the product had increased to about 9 which improved the rheological properties.

Example 3 in the Table shows the results of a polymerization in which the first compartment of the reactor was operated at 210°F/57 mol percent hydrogen and the second compartment was operated at 210°F/5 mol percent hydrogen. By controlling the relative proportions of materials made in the first and second compartments to a 70/30 ratio, the product exiting the reactor had an inherent viscosity of 1.99 dl/gram and a melt index of 0.67 grams/10 minutes. However, the measured $\overline{Mw}/\overline{Mn}$ of the product had increased to about 12. The changes in rheological properties by dual hydrogen operation are shown by the decrease in apparent viscosity at 5 sec$^{-1}$, 5.5 vs. $5.2 \times 10^4$ poise, the increase in shear rate for the beginning of oscillating flow, 650 vs 1560 sec$^{-1}$, and the increase in shear rate for melt fracture [$\gamma$ (MF)], 2400 vs 6900 sec$^{-1}$.

a. a horizontal reactor of substantially circular cross-section containing a centrally-located drive shaft extending longitudinally through said reactor to which are attached a plurality of adjacently located paddles, which paddles cause essentially no forward or backward movement of the particulate matter contained in said reactor and extend transversely within and to a short distance from the internal surfaces of said reactor, said reactor being divided into two or more individually gas-composition-controllable and polymerization-temperature controllable polymerization compartments by one or more dividing structures so constructed to control gas intermixing and movement of said particulate between said compartments;

b. driving means for said drive shaft;

c. one or more reactor off-gas outlets in each of said compartments spaced along the topward part of said reactor;

d. one or more vapor recycle inlets in each of said compartments space along the bottomward part of said reactor;

e. one or more catalyst addition inlets spaced along said reactor;

f. a plurality of quench liquid inlets spaced along the topward part of said reactor whereby quench liquid can be introduced into said two or more compartments; and g. take-off means for said particulate matter at one end of said reactor.

2. The apparatus of claim 1 wherein at least one compartment contains two or more individually polymerization-temperature-controllable polymerization sections divided by one or more barriers so constructed to allow free reactor gas mixing in said compartment and to control movement of said particulate matter between said sections.

3. The apparatus of claim 1 having two of said compartments each containing two individually polymerization-temperature-controllable polymerization sections divided by a barrier so constructed to allow free reactor gas mixing within the compartment and to control movement of said particulate matter between the sections of the compartment.

4. The apparatus of claim 1 wherein said take-off means is:

1. a thin barrier filling the cross-sectional area of said reactor and situated near one end of said reactor, which barrier contains an aperture so constructed to allow passage of reactor gases and controlled movement of said particulate matter in the direction of take-off;

TABLE

| | Components | | | | Split | Product | | | Rheology | | |
|---|---|---|---|---|---|---|---|---|---|---|---|
| Ex. | 1 | | 2 | | First/ | | M.I. | | App. visc. at 5 sec$^{-1}$ | SROF | (MF) |
| No. | ($\eta$) | M.I. | ($\eta$) | M.I. | Second Zone | ($\eta$), dl/gm | (g/10 min) | $\overline{Mw}/\overline{Mn}$ | ($\times 10^{-4}$ poise) | (sec$^{-1}$) | (sec$^{-1}$) |
| 1 | 2.0 | 0.97 | — | — | 100/0 | 2.0 | 0.97 | 5.6 | 5.5 | 650-2100 | 2400 |
| 2 | 1.02 | 28.6 | 2.83 | 0.16 | 42/58 | 2.10 | 0.68 | 9.1 | 5.6 | 928-1940 | 5100 |
| 3 | 1.02 | 28.6 | 4.5 | * | 70/30 | 1.99 | 0.67 | 11.7 | 5.2 | 1560-2630 | 6900 |

*Too low to measure accurately.

What is claimed is:

1. Apparatus for the vapor phase polymerization of at least one polymerizable monomer comprising:

2. a take-off zone contained in said reactor adjacent to said barrier in the direction of take-off which contains at least one impellor; and 3. an opening in said take-off zone whereby said particulate matter can be removed from said reactor without substantial pressure letdown.

5. The apparatus of claim 2 wherein said take-off means is:
1. a thin barrier filling the cross-sectional area of said reactor and situated near one end of said reactor, which barrier contains an aperture so constructed to allow passage of reactor gases and controlled movement of said particulte matter in the direction of take-off;
2. a take-off zone contained in said reactor adjacent to said barrier in the direction of take-off which contains at least one impellor; and
3. an opening in said take-off zone whereby said particulate matter can be removed from said reactor without substantial pressure letdown.

6. The apparatus of claim 3 wherein said take-off means is:
1. a thin barrier filling the cross-sectional area of said reactor and situated near one end of said reactor, which barrier contains an aperture so constructed to allow passage of reactor gases and controlled movement of said particulate matter in the direction of take-off;
2. a take-off zone contained in said reactor adjacent to said barrier in the direction of take-off which contains at least one impellor; and
3. an opening in said take-off zone whereby said particulate matter can be removed from said reactor without substantial pressure letdown.

7. The apparatus of claim 2 wherein said paddles are flat and arranged in impellors, each of said impellors containing two paddles and circularly off-set from the next adjacent impellor or impellors.

8. The apparatus of claim 3 wherein said paddles are flat and arranged in impellors, each of said impellors containing two paddles and circularly off-set from the next adjacent impellor or impellors.

9. The apparatus of claim 4 wherein said paddles are flat and arranged in impellors, each of said impellors containing two paddles and circularly off-set from the next adjacent impellor or impellors.

10. The apparatus of claim 5 wherein said paddles are flat and arranged in impellors, each of said impellors containing two paddles and circularly off-set from the next adjacent impellor or impellors.

11. The apparatus of claim 6 wherein said paddles are flat and arrange in impellors, each of said impellors containing two paddles and circularly off-set from the next adjacent impellor or impellors.

* * * * *

UNITED STATES PATENT OFFICE
CERTIFICATE OF CORRECTION

Patent No. 3,957,448  Dated May 18, 1976

Inventor(s) Shepard, John W., Jezl, James L., Peters, Edwin F., Hall, Robert D.

It is certified that error appears in the above-identified patent and that said Letters Patent are hereby corrected as shown below:

Column 7, line 55 "Divding" should be -- Dividing

" 7, " 59 "polymer" should be -- polymeric

" 9, " 53 "polymer" should be -- polymeric

Signed and Sealed this

Twenty-eighth Day of September 1976

[SEAL]

Attest:

RUTH C. MASON  
Attesting Officer

C. MARSHALL DANN  
Commissioner of Patents and Trademarks